US012687861B2

(12) United States Patent
Summer et al.

(10) Patent No.: US 12,687,861 B2
(45) Date of Patent: Jul. 21, 2026

(54) FLEET CONTROLLER FOR MULTIPLE TYPES OF UNCREWED VEHICLES

(71) Applicant: AeroVironment, Inc., Simi Valley, CA (US)

(72) Inventors: Matthew D. Summer, Melbourne, FL (US); William S. Bowman, Melbourne, FL (US); Mark B. Moffett, Grant, FL (US)

(73) Assignee: AeroVironment, Inc., Simi Valley, CA (US)

( * ) Notice: Subject to any disclaimer, the term of this patent is extended or adjusted under 35 U.S.C. 154(b) by 27 days.

(21) Appl. No.: 18/759,784

(22) Filed: Jun. 28, 2024

(65) Prior Publication Data

US 2026/0003370 A1     Jan. 1, 2026

(51) Int. Cl.
| | |
|---|---|
| *G05D 1/69* | (2024.01) |
| *G05D 1/248* | (2024.01) |
| *G05D 1/646* | (2024.01) |
| *G05D 1/65* | (2024.01) |
| *G05D 109/10* | (2024.01) |
| *G05D 109/20* | (2024.01) |

(52) U.S. Cl.
CPC .............. *G05D 1/69* (2024.01); *G05D 1/248* (2024.01); *G05D 1/646* (2024.01); *G05D 1/65* (2024.01); *G05D 2109/10* (2024.01); *G05D 2109/20* (2024.01)

(58) Field of Classification Search
None
See application file for complete search history.

(56) References Cited

U.S. PATENT DOCUMENTS

| | | | |
|---|---|---|---|
| 2019/0004547 A1* | 1/2019 | Querejeta Masaveu | ..................... G05D 1/12 |
| 2021/0209543 A1* | 7/2021 | Scott | .................... G06Q 10/083 |

* cited by examiner

*Primary Examiner* — Jason Holloway
*Assistant Examiner* — Christopher A Buksa
(74) *Attorney, Agent, or Firm* — Perkins Coie LLP

(57) ABSTRACT

Methods and systems are described herein for generating travel trajectories for uncrewed vehicles. In particular, a navigation system may receive (e.g., from an operator) a travel velocity for moving a fleet of uncrewed vehicles. The navigation system may then identify whether any aerial uncrewed vehicles have a minimum speed that is higher than the travel velocity. Based on the identifying one or more aerial uncrewed vehicles with minimum speed that is higher than the travel velocity, the navigation system may generate a travel trajectory for each aerial uncrewed vehicle. The travel trajectory may take into account vehicle parameters such as minimum turn radius.

20 Claims, 6 Drawing Sheets

300

Quadcopter 1 m/s

Rolling 1 m/s 10 m/s

Fixed Wing 5s     10s     15s     20s

309

100

200

| Vehicle ID | Min/Max Speed | Vehicle Type | Type Parameters |
|---|---|---|---|
| | 203 | 206 | 209 | 212 |
| Plane_A | 10 m/s – 35 m/s | Fixed Wing | <Min Turn Radius> |
| Quadcopter_B | 0 m/s – 40 m/s | Quad Rotor | <Max RPM> |
| Biped_C | 0 m/s – 3 m/s | Biped | <Stride Length> |

| Group ID | Vehicle IDs | Vehicle Type(s) |
|----------|-------------|-----------------|
| Group 1 | Vehicle_1 Vehicle_2 | Fixed Wing |
| Group 2 | Vehicle_3 Vehicle_4 | Rolling |
| Group 3 | Vehicle_5 Vehicle_6 | Legged |

FLEET CONTROLLER FOR MULTIPLE TYPES OF UNCREWED VEHICLES

BACKGROUND

Stable and reliable robotic systems are becoming increasingly common, which has contributed to the recent advancement and proliferation of uncrewed system technologies. Generally, uncrewed systems (e.g., aerial uncrewed vehicles) are able to navigate using operator commands and/or the Global Positioning System (GPS) to autonomously navigate to target locations. These uncrewed systems are designed to accept operator commands and travel (e.g., fly) based on those commands. Recently, use of multiple uncrewed systems to achieve an objective has become more common. However, controlling multiple uncrewed systems by a single operator is difficult, especially when those uncrewed systems are of different types (e.g., fixed wing, rotor, rolling, quadruped, biped, etc.). For example, an operator may have to send different instructions to different types of uncrewed systems to have those uncrewed systems move in unison. Accordingly, a mechanism is desired to simplify fleet control of different uncrewed systems.

SUMMARY

Therefore, methods and systems are described herein for navigating fleets of uncrewed vehicles. A navigation system may be used as part of the mechanism of navigating fleets of uncrewed vehicles. The navigation system may reside, at least partially, at a central location (e.g., a command-and-control point) and/or on a computing device being used by an operator. For example, a command-and-control point may be in a vehicle equipped with one or more computing devices, in a datacenter that houses computing devices, or in another suitable environment. In another example, a vehicle controller may be used for performing operations described herein.

In some embodiments, the navigation system may receive a travel velocity (e.g., including a travel speed and direction) for moving a plurality of uncrewed vehicles. The plurality of uncrewed vehicles may include an aerial uncrewed vehicle and/or a land-based vehicle. For example, an operator may desire to send a fleet of uncrewed vehicles to a particular location. The fleet may include various vehicles, such as land-based vehicles (e.g., rolling vehicles, bipeds, quadrupeds, etc.). Those vehicles may have different maneuvering capabilities. For example, each uncrewed vehicle may have a maximum speed and a minimum speed. While some uncrewed vehicles may have zero as a minimum speed, others may have a minimum speed that is not zero. For example, a fixed wing plane may have a minimum speed that is non-zero in order to keep flying. In another example, some vehicles may have various maneuvering capabilities. A quadcopter may be able to maneuver freely in any direction, while a biped may not be able to perform certain maneuvers without falling. Thus, in some embodiments, the navigation system may determine a plurality of uncrewed vehicles within the fleet of uncrewed vehicles such that the plurality of uncrewed vehicles includes a land-based uncrewed vehicle and an aerial uncrewed vehicle.

In some embodiments, the navigation system may analyze parameters of each uncrewed vehicle within the fleet of uncrewed vehicles and determine maneuvering capabilities for each uncrewed vehicle. In particular, the navigation system may determine a plurality of speed ranges for the plurality of uncrewed vehicles within the fleet, with each speed range including a corresponding vehicle minimum speed and a corresponding vehicle maximum speed. For example, the navigation system may access a data structure storing that information and locate the parameters (e.g., minimum speed and maximum speed) within that data structure. In some embodiments, the navigation system may query the uncrewed vehicles themselves for the minimum speed and the maximum speed.

In some embodiments, the navigation system may determine that the aerial uncrewed vehicle has a minimum speed that is higher than the travel velocity. For example, a fixed winged uncrewed aircraft may need a particular minimum speed in order to continue flying. If that minimum speed is not maintained, the aircraft may crash or lose altitude. Accordingly, the navigation system, before instructing that uncrewed vehicle, may determine that the instruction either will not be followed by the logic on the aircraft or may cause the aircraft to malfunction (e.g., crash).

Based on determining that the aerial uncrewed vehicle has the minimum speed that is higher than the travel speed, the navigation system may generate a travel trajectory for the aerial uncrewed vehicle based on the travel speed and the minimum speed. The travel trajectory may cause the aerial uncrewed vehicle to move at least at the minimum speed. Furthermore, the travel trajectory may cause the aerial uncrewed vehicle to travel a distance that matches a projected linear distance of travel at the travel speed when measured during a predetermined time interval. For example, the navigation system may determine a time interval or a distance interval as the fleet of uncrewed vehicles is moving, where the aerial vehicle should be directly or approximately directly above one or more land-based vehicles within the fleet. Based on that interval, the navigation system may generate a path and speed for the aerial uncrewed vehicle (e.g., flying in a circle, semi-circle, etc.) to reach the same point (e.g., latitude and longitude) as the other vehicles within the fleet that are traveling at the travel speed.

In some embodiments, to determine the travel trajectory, the navigation system may determine the minimum speed for the aerial uncrewed vehicle and the minimum distance (e.g., based on the minimum speed) that the aerial uncrewed vehicle is predicted to travel within a predetermined time interval (e.g., one minute, ten minutes, thirty minutes, etc.). During the same time interval, the navigation system may determine a linear distance that the rest of the fleet is predicted to travel as the fleet travels at the travel speed. Based on that information, the navigation system may generate a travel trajectory (e.g., one or more circles, a semi-circle, or another suitable trajectory) for the aerial uncrewed vehicle. That is, the aerial uncrewed vehicle will intersect (e.g., be above) the rest of the fleet at a particular location or at a particular time.

In some embodiments, the travel trajectory may be generated based on other parameters of the uncrewed vehicle. For example, an aerial uncrewed vehicle may have a minimum and a maximum turn radius. Accordingly, the navigation system may adjust both the speed (e.g., set the speed above the minimum speed) and direction of the travel trajectory according to the minimum turn radius.

In yet some embodiments, the travel trajectory may be adjusted for land-based vehicles. In particular, certain land-based vehicles may not be able to travel over a particular terrain while other land-based vehicles may be able to travel over that terrain. For example, a rolling vehicle may be stuck in a place where a biped or a quadruped may not get stuck due to the nature of legged movement. In another example, a rolling vehicle may be able to get through terrains where bipeds and/or quadrupeds may get stuck. Accordingly, the navigation system may update the trajectory of land-based vehicles (e.g., speed and direction) to keep up with the fleet.

The navigation system may then cause the aerial uncrewed vehicle to travel according to the travel trajectory. For example, the navigation system may transmit the travel trajectory to the aerial uncrewed vehicle to be executed. In some embodiments, the vehicle controller may control the aerial uncrewed vehicle by adjusting the path (e.g., speed and direction) while the aerial uncrewed vehicle is traveling at minimum speed or another suitable speed.

Various other aspects, features, and advantages of the system will be apparent through the detailed description and the drawings attached hereto. It is also to be understood that both the foregoing general description and the following detailed description are examples, and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data), unless the context clearly dictates otherwise.

BRIEF DESCRIPTION OF THE DRAWINGS

FIG. 4 illustrates an excerpt of a data structure that may store groupings of uncrewed vehicles within the fleet, in accordance with one or more embodiments of this disclosure.

DETAILED DESCRIPTION

In the following description, for the purposes of explanation, numerous specific details are set forth in order to provide a thorough understanding of the disclosed embodiments. It will be appreciated, however, by those having skill in the art, that the embodiments may be practiced without these specific details, or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Figure 1:
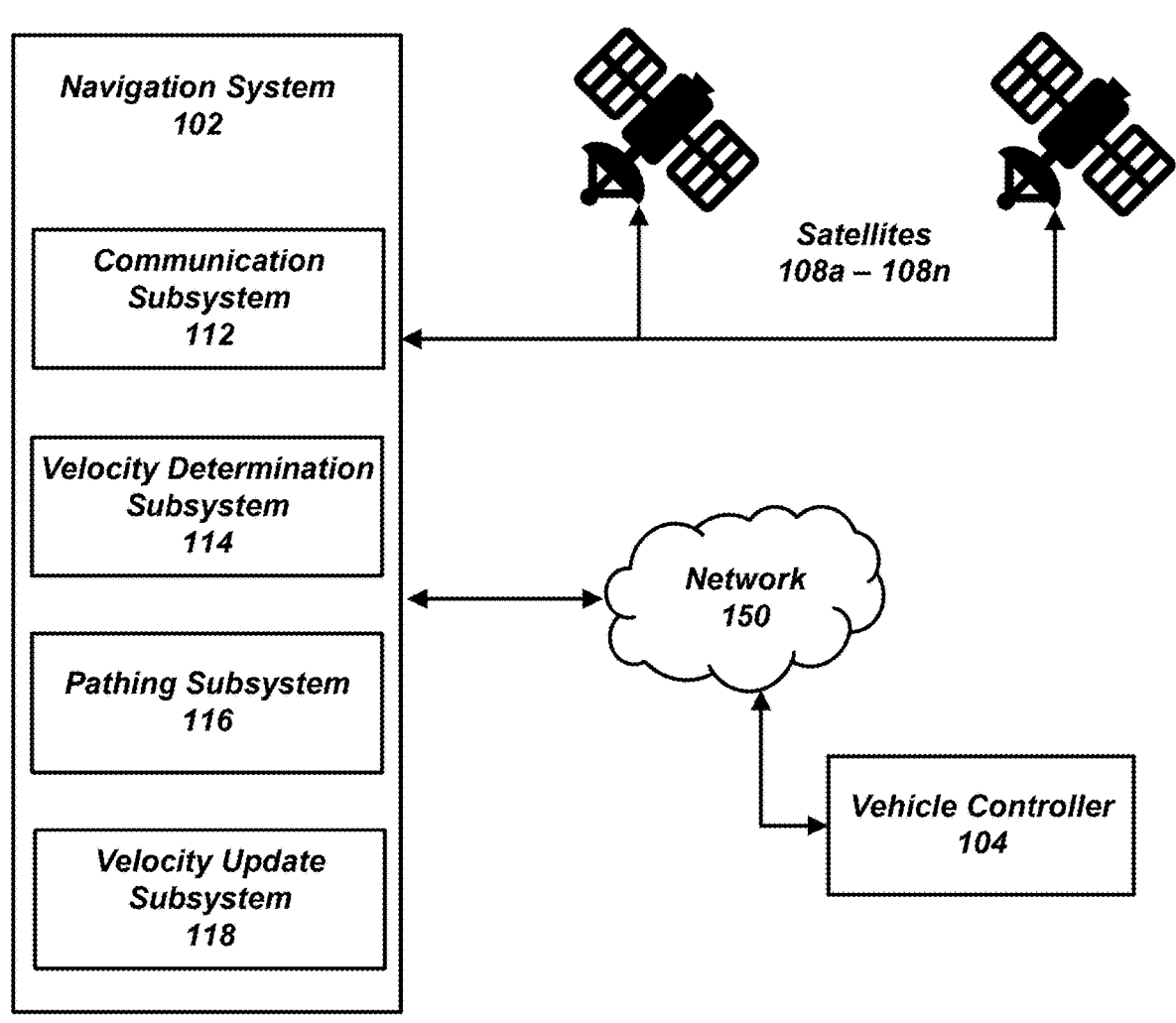
FIG. 1 shows an illustrative system for navigating a fleet of uncrewed vehicles, in accordance with one or more embodiments of this disclosure.

FIG. 1 is an example of an environment 100 for navigating a fleet of uncrewed vehicles. Environment 100 includes navigation system 102, vehicle controller 104, and satellites 108a-108n. Navigation system 102 may execute instructions for navigating a fleet of uncrewed vehicles. Navigation system 102 may include software, hardware, or a combination of the two. In some embodiments, although shown separately, navigation system 102 and vehicle controller 104 may reside on the same computing device.

Vehicle controller 104 may be used to control one or more uncrewed vehicles. For example, vehicle controller 104 may communicate with one or more uncrewed vehicles to send instructions/commands to those uncrewed vehicles. The communication may be performed over a network 150 (e.g., a radio wireless network). Vehicle controller 104 may include an input device to receive input from an operator. The input device may be a joystick or another type of controller. In some embodiments, the input device may be a touch screen. Accordingly, vehicle controller 104 may include software, hardware, or a combination of the two. In some embodiments, vehicle controller 104 may be a smartphone or an electronic tablet with an appropriate application or applications. In yet some embodiments, vehicle controller 104 may be a specialized controller for controlling uncrewed vehicles or a combination of a specialized controller and a smartphone. Network 150 may be a local area network, a wide area network (e.g., the Internet), or a combination of the two. Satellites 108a-108n may be satellites in orbit that may be used for determining uncrewed vehicle positions (e.g., via GPS coordinates).

Navigation system 102 may receive a travel velocity for moving a plurality of uncrewed vehicles. The plurality of uncrewed vehicles may include an aerial uncrewed vehicle. Furthermore, the travel velocity may include a travel speed and a direction. Navigation system 102 may receive the travel velocity from, for example, an operator interface that is part of vehicle controller 104. An operator may input the travel velocity into the vehicle controller using an input interface (e.g., a touch screen or another suitable input interface). In some embodiments, navigation system 102 may be part of the vehicle controller; thus, operator input of a travel velocity may be received from the input device of the vehicle controller through a hardware channel.

In some embodiments, the navigation system may be outside of the vehicle controller. Accordingly, navigation system 102 may receive the travel velocity using communication subsystem 112. Communication subsystem 112 may include software components, hardware components, or a combination of both. For example, communication subsystem 112 may include a network card (e.g., a wired/wireless network card/processor) that is coupled with software to drive the card/processor. The network card may be built into a server or another suitable computing device. Communication subsystem 112 may pass the travel velocity or a pointer to an address in memory to velocity determination subsystem 114.

Velocity determination subsystem 114 may include software components, hardware components, or a combination of both. In some embodiments, velocity determination subsystem 114 may determine a plurality of uncrewed vehicles within the fleet of uncrewed vehicles. As discussed above, the plurality of uncrewed vehicles may include a land-based uncrewed vehicle and an aerial uncrewed vehicle. Velocity determination subsystem 114 may identify uncrewed vehicles within the fleet using a number of mechanisms. For example, an operator may use a vehicle controller (e.g., vehicle controller 104) to assign the plurality of uncrewed vehicles to a fleet. Those assignments may be stored in a data structure. In some embodiments, the uncrewed vehicles within the fleet may be discovered by the vehicle controller and added to a fleet to be controlled by the vehicle controller.

In these embodiments, navigation system 102 may add identifiers of those vehicles together with other vehicle information (e.g., to control the vehicles) to a data structure.

Figure 2:
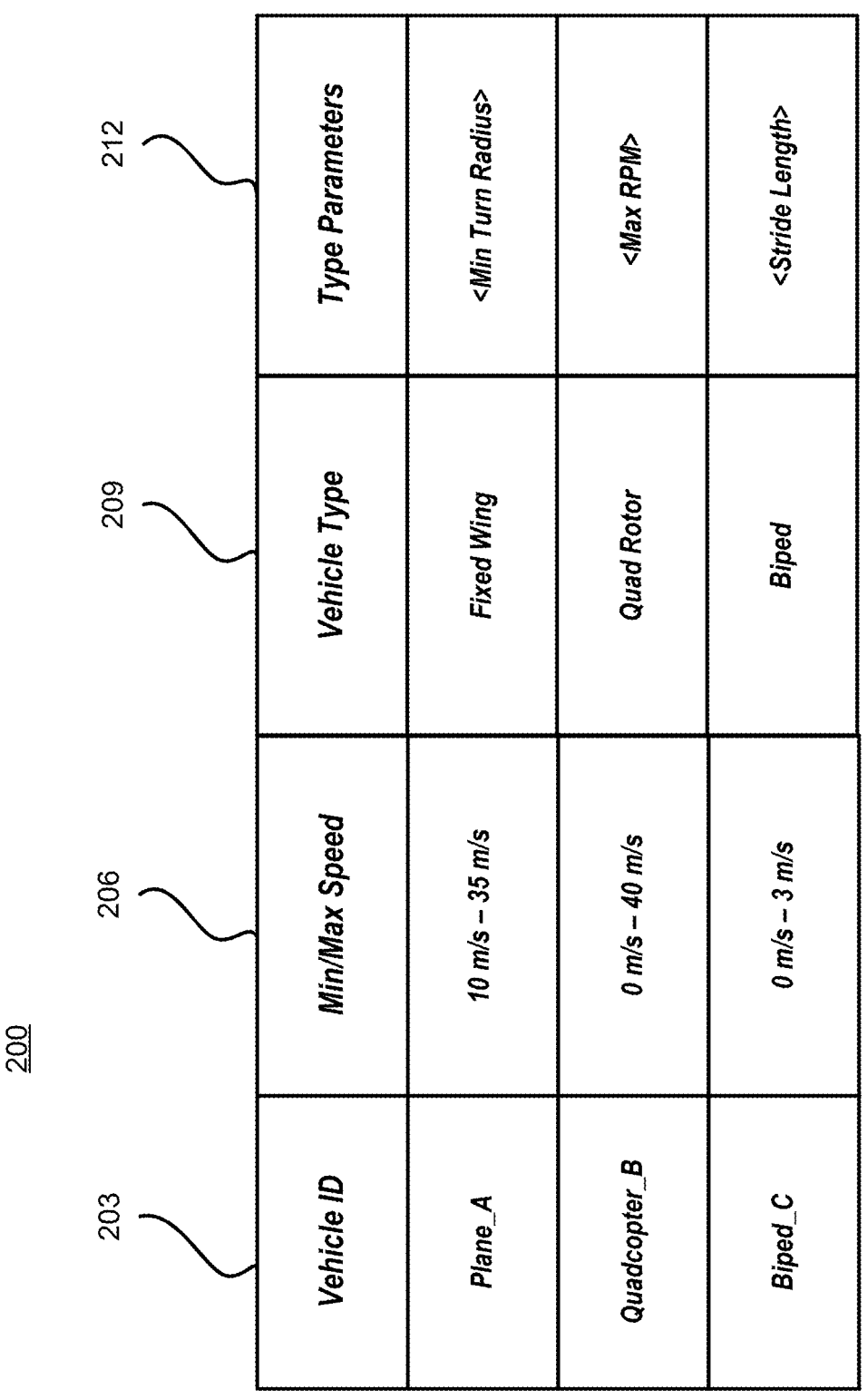
FIG. 2 illustrates an excerpt of a data structure that may store vehicle data for uncrewed vehicles within the fleet, in accordance with one or more embodiments of this disclosure.

FIG. 2 illustrates an excerpt of a data structure 200 that may store vehicle data for uncrewed vehicles within the fleet. Data structure 200 may include field 203 that stores vehicle identifiers of various uncrewed vehicles within the fleet of vehicles. A vehicle identifier may be a number, a string, or another suitable identifier. Field 206 may store a speed range of each corresponding uncrewed vehicle. The speed range may include a minimum speed and a maximum speed. Field 209 may store a vehicle type for the corresponding uncrewed vehicle. Vehicle types may include land-based and aerial, as well as more specific vehicle types such as fixed wing, quad rotor, biped, etc. In some embodiments, the fleet may include watercraft and underwater types of vehicles. Field 212 may include parameters related to particular vehicle types. For example, a fixed wing aerial vehicle may have a minimum turn radius as a parameter while a biped may have a stride length as a parameter. Other parameters may include maximum rotations per minute (RPM) for vehicles with rotors. Data structure 200 may store other information for each uncrewed vehicle.

In some embodiments, velocity determination subsystem 114 may obtain vehicle information such as speed ranges. In particular, velocity determination subsystem 114 may determine a plurality of speed ranges for the plurality of uncrewed vehicles within the fleet of uncrewed vehicles. As discussed above, each speed range may include a corresponding minimum speed and a corresponding maximum speed. For example, when each uncrewed vehicle is connected to the navigation system and/or to vehicle controller 104, navigation system 102 may query the uncrewed vehicle for vehicle parameters (e.g., minimum speed, maximum speed, and/or other suitable parameters). Navigation system 102 may store those parameters in a data structure, for example, as shown in FIG. 2. Thus, velocity determination subsystem 114 may retrieve those minimum and maximum speeds.

In some embodiments, velocity determination subsystem 114 may determine that the travel velocity is faster than a maximum speed of one or more uncrewed vehicles within the fleet. Accordingly, velocity determination subsystem 114 may generate a notification to the operator that one or more uncrewed vehicles are unable to keep up with the fleet. Velocity determination subsystem 114 may recommend that the operator adjust the travel velocity according to the slowest uncrewed vehicle within the fleet. In some embodiments, velocity determination subsystem 114 may determine that the aerial uncrewed vehicle has a minimum speed that is higher than the travel speed. For example, a fixed wing aerial drone may have a minimum speed that is higher than the travel velocity because the fixed wing aerial drone may crash if its speed falls below a particular number.

In some embodiments, velocity determination subsystem 114 may query a data structure storing vehicle data and compare the received travel velocity with a minimum velocity and a maximum velocity for each uncrewed vehicle within the fleet. For example, velocity determination subsystem 114 may retrieve, for the plurality of uncrewed vehicles within the fleet, corresponding vehicle data associated with each vehicle. The vehicle data may be retrieved from a data structure stored, for example, on vehicle controller 104. In some embodiments, the vehicle data may be retrieved from the uncrewed vehicles themselves either at the time of registering the uncrewed vehicle with the navigation system or on the fly.

Velocity determination subsystem 114 may then extract from the corresponding vehicle data the corresponding maximum speed and the corresponding minimum speed. For example, velocity determination subsystem 114 may search for data fields as illustrated in FIG. 2 to extract the correct data. Velocity determination subsystem 114 may then compare the minimum speed and the travel velocity.

Velocity determination subsystem 114 may flag any uncrewed vehicles where the travel velocity is outside of the vehicle's speed range. In some embodiments, velocity determination subsystem 114 may generate for display on a display screen associated with vehicle controller 104 one or more indications of uncrewed vehicles where the travel velocity is outside of the speed range of the particular vehicle. Velocity determination subsystem 114 may request that an operator perform an action or display one or more options for the operator. Velocity determination subsystem 114 may then pass one or more vehicle identifiers to pathing subsystem 116. Pathing subsystem 116 may include software components, hardware components, or a combination of both. For example, pathing subsystem 116 may include software components that access data in memory and/or storage, and may use one or more processors to perform its operations.

Pathing subsystem 116 may then generate a travel trajectory for one or more aerial uncrewed vehicles. In particular, based on determining that the aerial uncrewed vehicle has the minimum speed that is higher than the travel speed, pathing subsystem 116 may generate a travel trajectory for the aerial uncrewed vehicle based on the travel speed and the minimum speed of the aerial uncrewed vehicle. The travel trajectory may cause the aerial uncrewed vehicle to move at least at the minimum speed. Furthermore, the travel trajectory may cause the aerial uncrewed vehicle to travel a distance that matches a projected linear distance of travel at the travel speed when measured during a predetermined time interval.

Figure 3:
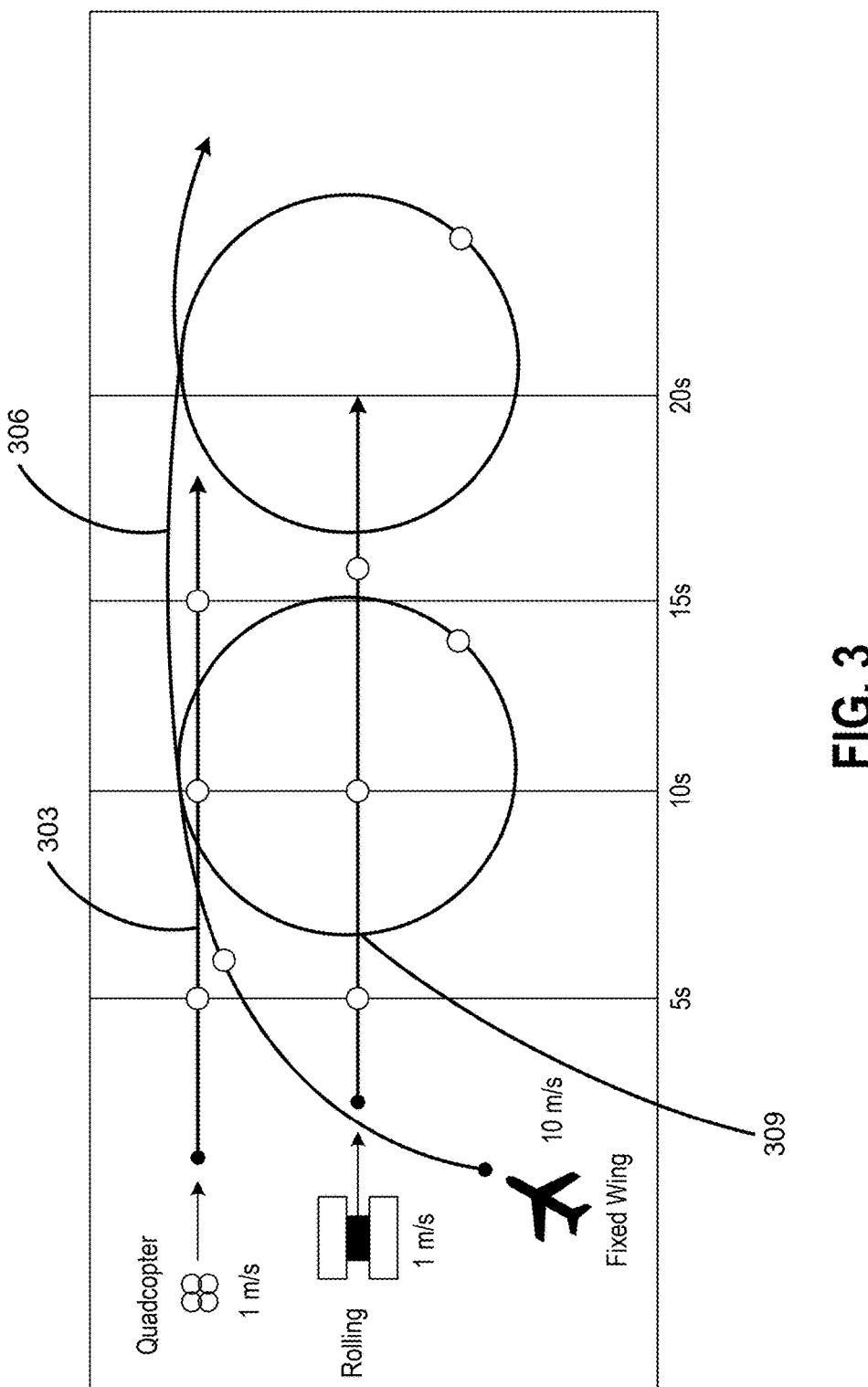
FIG. 3 illustrates exemplary trajectory paths for uncrewed vehicles, in accordance with one or more embodiments of this disclosure.

FIG. 3 includes an illustration 300 that shows exemplary trajectory paths for various uncrewed vehicles. Trajectory path 303 represents a trajectory path for a quadcopter that is able to travel at the travel velocity. That is, the travel velocity lies between the minimum speed and the maximum speed of the quadcopter. It should be noted that the quadcopter is able to hover in place, thus enabling the quadcopter to have a minimum speed of zero. Trajectory path 306 represents a trajectory path of a fixed wing airplane that has a minimum speed above zero. That is, the fixed wing airplane is unable to hover and if its speed falls below a particular value, the fixed wing airplane may fall from the sky. As the aerial uncrewed vehicle travels along its trajectory (e.g., in a circle, in an ellipse, or in another suitable trajectory), the path of the aerial uncrewed vehicle may intermittently intersect the path of other vehicles within the fleet. For example, as shown in FIG. 3, the trajectories of the rolling uncrewed vehicle and the fixed wing airplane will cause those vehicles to essentially intersect at point 309, albeit at different altitudes. That is, the longitude and latitude of those uncrewed vehicles may be the same or essentially the same. However, the aerial uncrewed vehicle will be in the air while the rolling uncrewed vehicle will be on the ground.

In some embodiments, to achieve this, the concept of linear distance may be used. For example, pathing subsystem 116 may calculate a linear distance that the aerial uncrewed vehicle may travel at minimum speed over different time periods, when that minimum speed is higher than the travel velocity. For example, pathing subsystem 116 may determine a linear distance for every five seconds, ten seconds, thirty seconds, or another suitable time interval. In particular, pathing subsystem 116 may determine the minimum speed of the aerial uncrewed vehicle (e.g., by retrieving the minimum speed from a data structure as shown in FIG. 2).

Pathing subsystem 116 may then determine, based on the minimum speed of the aerial uncrewed vehicle, a minimum travel distance predicted to be traveled by the aerial uncrewed vehicle during the predetermined time interval at the minimum speed. As discussed above, pathing subsystem 116 may determine a linear distance for every five seconds, ten seconds, thirty seconds, or another suitable time interval. In addition, pathing subsystem 116 may determine, based on the travel velocity, a linear distance that an object travels during the predetermined time interval at the travel velocity. That is, pathing subsystem 116 may determine a distance that other uncrewed vehicles within the fleet are expected to travel at the travel velocity during the same time interval or another predetermined time interval.

Based on the linear distances, pathing subsystem 116 may determine a travel trajectory for the aerial uncrewed vehicle. In particular, pathing subsystem 116 may generate the travel trajectory of the aerial uncrewed vehicle to maneuver the aerial uncrewed vehicle so that the minimum travel distance matches the linear distance. For example, if pathing subsystem 116 determines that the paths of the aerial uncrewed vehicle and other uncrewed vehicles within the fleet should intersect every thirty seconds, pathing subsystem 116 may generate a particular travel trajectory (e.g., a circle of a particular diameter) for the aerial uncrewed vehicle.

In some embodiments, pathing subsystem 116 may determine the predetermined time interval based on travel time to the target location. In particular, pathing subsystem 116 may receive a target position from a vehicle controller and determine, based on the target position and the travel velocity, a time estimate for traveling from a current position to the target position. For example, if the target position is ten kilometers away and the travel velocity is five kilometers per hour, pathing subsystem 116 may determine that the time to target is two hours. Based on the time to target, pathing subsystem 116 may split the time into intervals (e.g., equal time intervals). To continue with the example above, if the time to target is two hours, the time interval may be one minute, two minutes, five minutes, or another suitable time interval. In some embodiments, the time interval may be thirty seconds. Thus, pathing subsystem 116 may split the time estimate into a plurality of instances of the predetermined time interval. Based on those time intervals, pathing subsystem 116 may generate a travel trajectory for the aerial uncrewed vehicle.

In some embodiments, pathing subsystem 116 may take into account parameters of the aerial uncrewed vehicle when generating the travel trajectory. For example, pathing subsystem 116 may take into account a minimum turn radius for generating a travel trajectory. This is because the minimum turn radius may enable generating some travel trajectories, but not others. For example, if the minimum turn radius is too large for a particular time interval, that time interval may not be possible. Thus, pathing subsystem 116 may determine a minimum turn radius for the aerial uncrewed vehicle and may determine the travel trajectory based on the minimum turn radius. For example, pathing subsystem 116 may determine that certain trajectory paths are not possible with particular aerial uncrewed vehicles that have a certain minimum turning radius.

When the travel trajectory has been generated, pathing subsystem 116 may cause the aerial uncrewed vehicle to travel according to the travel trajectory. For example, pathing subsystem 116 may pass the travel trajectory to velocity update subsystem 118. Velocity update subsystem 118 may include software components, hardware components, or a combination of both. For example, velocity update subsystem 118 may include software components that access data in memory and/or storage and may use one or more processors to generate instructions for uncrewed vehicles. Velocity update subsystem 118 may process the travel trajectory and transmit velocity update instructions to the aerial uncrewed vehicle. The aerial uncrewed vehicle may process the instructions and send instruction confirmations, position data, and/or other data to velocity update subsystem 118. In some embodiments, the aerial uncrewed vehicle may be enabled to process the trajectory on the vehicle itself. Thus, velocity update subsystem 118 may transmit the travel trajectory to the aerial uncrewed vehicle. The aerial uncrewed vehicle may execute the travel trajectory according to the received instructions.

In some embodiments, navigation system 102 may perform trajectory adjustments for land-based vehicles, for example, based on terrain information. In particular, navigation system 102 may receive an electronic map that includes a plurality of terrains between a current position and a target position. For example, certain terrains may not be passable by legged uncrewed vehicles, while other terrains may not be passable by rolling uncrewed vehicles. Thus, a map may be a data structure that includes terrain types and locations of those terrains. In some embodiments, the map may include locations of those terrains relative to a path of the fleet. Navigation system 102 may determine, based on the terrain map and the parameters of the uncrewed vehicles within the fleet, whether all the uncrewed vehicles will be able to pass through those terrains. In some embodiments, one or more aerial uncrewed vehicles may be generating the terrain maps for various portions of the travel path of the fleet.

Navigation system 102 may analyze vehicle parameters for the uncrewed vehicle and may determine that some land-based uncrewed vehicles may be able to travel with the fleet to a target position, while other land-based uncrewed vehicles may need a detour due to the different types of terrain. Thus, navigation system 102 may determine, for a land-based uncrewed vehicle of the plurality of uncrewed vehicles and based on the plurality of terrains, a path for traveling to the target position. For example, a legged uncrewed vehicle may not be able to travel through certain terrains that may be, for example, too muddy or too steep. Thus, navigation system 102 may adjust the path. In addition, to keep up with the fleet, navigation system 102 may adjust (e.g., using velocity update subsystem 118) the speed of that land-based uncrewed vehicle.

Thus, in some embodiments, navigation system 102 may determine that a linear distance associated with the path is greater than the linear distance associated with the travel velocity and increase the travel speed for the land-based uncrewed vehicle based on the travel velocity, the linear distance, and the path. For example, navigation system 102 may determine that the travel trajectory for the land-based uncrewed vehicle adds one hundred meters to a linear distance being traversed during a certain portion of the travel. Thus, navigation system 102 may increase the speed of the land-based uncrewed vehicle so that the land-based uncrewed vehicle is able to rejoin the fleet at a predetermined point (e.g., within the portion of the travel).

In some embodiments, the travel velocity may be higher than the maximum velocity of one or more uncrewed vehicles. In this instance, navigation system 102 may provide a warning to an operator. The warning may indicate one or more uncrewed vehicles that are unable to keep up with the travel velocity. In the instances when an operator does not adjust the travel velocity, navigation system 102 may split the fleet into groups, for example, to protect the uncrewed vehicle that is unable to keep up. Thus, navigation system 102 may determine, based on a first maximum speed of a first uncrewed vehicle, that the first uncrewed vehicle of the plurality of uncrewed vehicles has a maximum speed lower than the travel speed. Navigation system 102 may use a data structure (e.g., as shown in FIG. 2) to retrieve the maximum velocity.

Navigation system 102 may then determine a group of uncrewed vehicles of the plurality of uncrewed vehicles that is associated with the first uncrewed vehicle. For example, if the uncrewed vehicle that is unable to keep up is a rolling vehicle that is carrying operator equipment, navigation system 102 may assign other uncrewed vehicles (e.g., having armaments) to escort the rolling uncrewed vehicle. In some embodiments, the groups may be predetermined. FIG. 4 illustrates an excerpt of a data structure 400 that may store groupings of uncrewed vehicles within the fleet. Field 403 may store a group identifier for each group. Field 406 may store vehicle identifiers for corresponding vehicles within the group. Field 409 may store vehicle types associated with the uncrewed vehicles within each group. In some embodiments, navigation system 102 may generate groups on the fly based on a type of vehicle that is unable to keep up with the travel speed. For example, if a quadruped is unable to keep up, navigation system 102 may assign a quadcopter and/or a rolling vehicle to escort the quadruped. Navigation system 102 may then update the travel speed for the group of uncrewed vehicles to match the maximum speed of the first uncrewed vehicle.

Computing Environment

Figure 5:
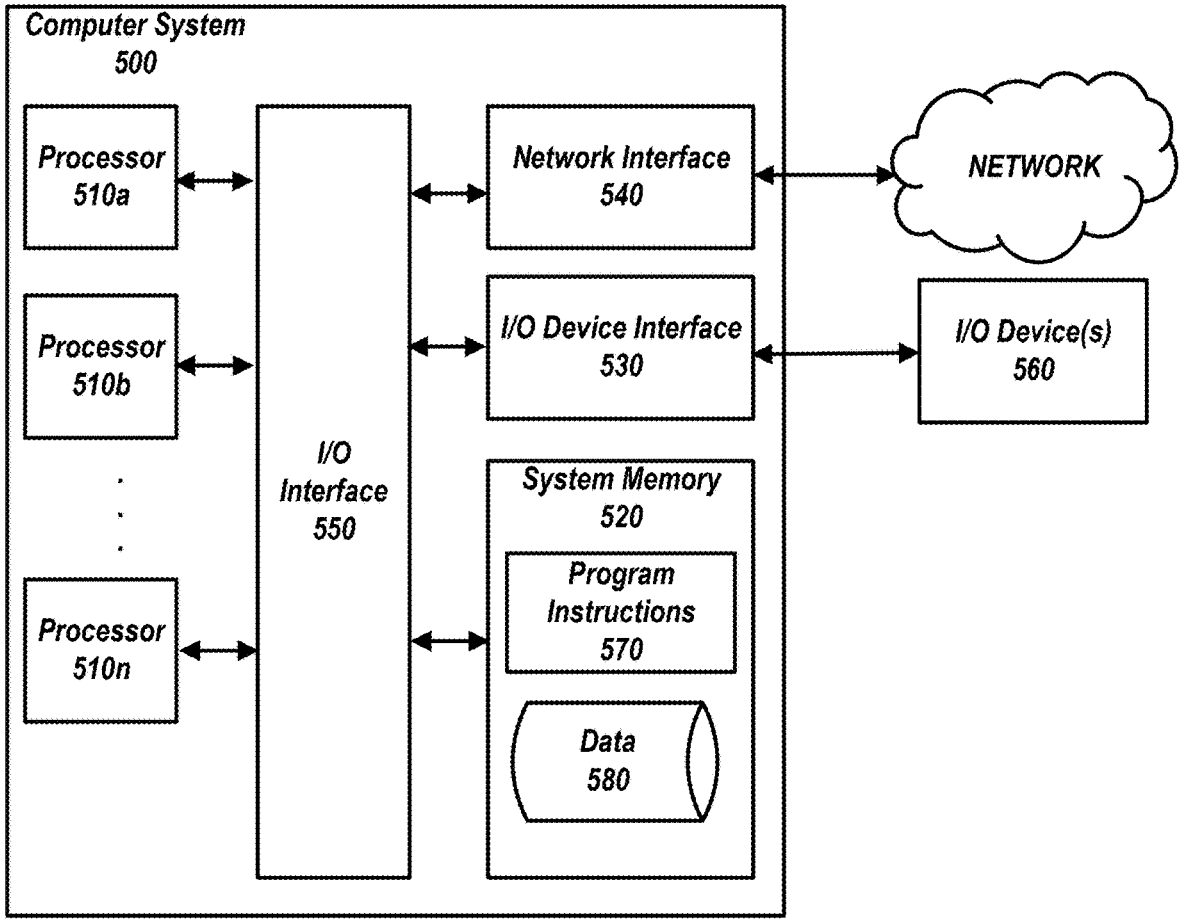
FIG. 5 illustrates a computing device, in accordance with one or more embodiments of this disclosure.

FIG. 5 shows an example computing system that may be used in accordance with some embodiments of this disclosure. In some instances, computing system 500 is referred to as a computer system. A person skilled in the art would understand that those terms may be used interchangeably. The computing system may be hosted on a device (e.g., a smartphone, a tablet, or another suitable device) that an operator may control. In some embodiments, the computing system may be hosted on a vehicle controller, within a command-and-control point such as a datacenter, a vehicle, or at another suitable location. The components of FIG. 5 may be used to perform some or all operations discussed in relation to FIGS. 1-4. Furthermore, various portions of the systems and methods described herein may include or be executed on one or more computer systems similar to computing system 500. Further, processes and modules described herein may be executed by one or more processing systems similar to that of computing system 500.

Computing system 500 may include one or more processors (e.g., processors 510a-510n) coupled to system memory 520, an input/output (I/O) device interface 530, and a network interface 540 via an I/O interface 550. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 500. A processor may execute code (e.g., processor firmware, a protocol stack, a database management system, an operating system, or a combination thereof)

that creates an execution environment for program instructions. A processor may include a programmable processor. A processor may include general or special purpose microprocessors. A processor may receive instructions and data from a memory (e.g., system memory 520). Computing system 500 may be a uni-processor system including one processor (e.g., processor 510a), or a multi-processor system including any number of suitable processors (e.g., 510a-510n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computing system 500 may include a plurality of computing devices (e.g., distributed computer systems) to implement various processing functions.

I/O device interface 530 may provide an interface for connection of one or more I/O devices 560 to computer system 500. I/O devices may include devices that receive input (e.g., from a user) or output information (e.g., to a user). I/O devices 560 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 560 may be connected to computer system 500 through a wired or wireless connection. I/O devices 560 may be connected to computer system 500 from a remote location. I/O devices 560 located on remote computer systems, for example, may be connected to computer system 500 via a network and network interface 540.

Network interface 540 may include a network adapter that provides for connection of computer system 500 to a network. Network interface 540 may facilitate data exchange between computer system 500 and other devices connected to the network. Network interface 540 may support wired or wireless communication. The network may include an electronic communication network, such as the Internet, a local area network (LAN), a wide area network (WAN), a cellular communications network, or the like.

System memory 520 may be configured to store program instructions 570 or data 580. Program instructions 570 may be executable by a processor (e.g., one or more of processors 510a-510n) to implement one or more embodiments of the present techniques. Program instructions 570 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site, or distributed across multiple remote sites and interconnected by a communication network.

System memory 520 may include a tangible program carrier having program instructions stored thereon. A tangible program carrier may include a non-transitory computer-readable storage medium. A non-transitory computer-readable storage medium may include a machine-readable storage device, a machine-readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random-access memory (SRAM), synchronous dynamic RAM (SDRAM)), bulk storage memory (e.g., CD-ROM and/or DVD-ROM, hard drives), or the like. System memory 520 may include a non-transitory computer-readable storage medium that may have program instructions stored thereon that are executable by a computer processor (e.g., one or more of processors 510a-510n) to cause the subject matter and the functional operations described herein. A memory (e.g., system memory 520) may include a single memory device and/or a plurality of memory devices (e.g., distributed memory devices).

I/O interface 550 may be configured to coordinate I/O traffic between processors 510a-510n, system memory 520, network interface 540, I/O devices 560, and/or other peripheral devices. I/O interface 550 may perform protocol, timing, or other data transformations to convert data signals from one component (e.g., system memory 520) into a format suitable for use by another component (e.g., processors 510a-510n). I/O interface 550 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 500, or multiple computer systems 500 configured to host different portions or instances of embodiments. Multiple computer systems 500 may provide for parallel or sequential processing/execution of one or more portions of the techniques described herein.

Figure 6:
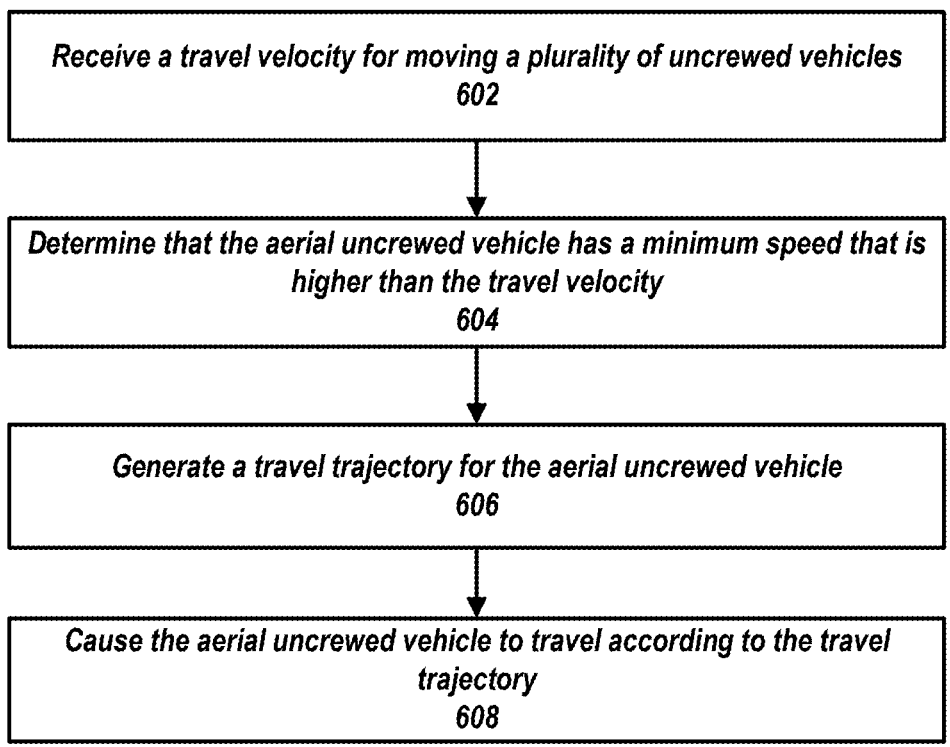
FIG. 6 is a flowchart of operations for navigating a fleet of uncrewed vehicles, in accordance with one or more embodiments of this disclosure.

Those skilled in the art will appreciate that computer system 500 is merely illustrative, and is not intended to limit the scope of the techniques described herein. Computer system 500 may include any combination of devices or software that may perform or otherwise provide for the performance of the techniques described herein. For example, computer system 500 may include or be a combination of a cloud-computing system, a datacenter, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, the Global Positioning System, or the like. Computer system 500 may also be connected to other devices that are not illustrated, or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.
Operation Flow FIG. 6 is a flowchart 600 of operations for navigating a fleet of uncrewed vehicles. The operations of FIG. 6 may use components described in relation to FIG. 5. In some embodiments, navigation system 102 may include one or more components of computing system 500. At 602, navigation system 102 receives a travel velocity for moving a plurality of uncrewed vehicles. Navigation system 102 may receive the travel velocity over network 150 using network interface 540. In some embodiments, navigation system 102 may receive the travel velocity at vehicle controller 104.

At 604, navigation system 102 determines that the aerial uncrewed vehicle has a minimum speed that is higher than the travel velocity. For example, navigation system 102 may use one or more processors 510a, 510b, and/or 510n to perform the determination. At 606, navigation system 102 generates a travel trajectory for the aerial uncrewed vehicle. For example, navigation system 102 may use one or more processors 510a-510n to perform the determination.

At 608, navigation system 102 causes the aerial uncrewed vehicle to travel according to the travel trajectory. Navigation system 102 may perform this operation using one or more processors 510a, 510b, and/or 510n. For example, navigation system 102 may send the travel trajectory to the aerial uncrewed vehicle using network interface 540 over network 150.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration, and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: receiving a travel velocity for moving a plurality of uncrewed vehicles, wherein the plurality of uncrewed vehicles comprises an aerial uncrewed vehicle, and wherein the travel velocity comprises a travel speed; determining that the aerial uncrewed vehicle has a minimum speed that is higher than the travel velocity; based on determining that the aerial uncrewed vehicle has the minimum speed that is higher than the travel speed, generating a travel trajectory for the aerial uncrewed vehicle based on the travel speed and the minimum speed, wherein the travel trajectory causes the aerial uncrewed vehicle to move at least at the minimum speed, and wherein the travel trajectory causes the aerial uncrewed vehicle to travel a distance that matches a projected linear distance of travel at the travel speed when measured during a predetermined time interval; and causing the aerial uncrewed vehicle to travel according to the travel trajectory.

2. Any of the preceding embodiments, wherein determining that the aerial uncrewed vehicle has the minimum speed that is higher than the travel velocity further comprises: retrieving, for the plurality of uncrewed vehicles, corresponding vehicle data associated with each vehicle; extracting from vehicle data associated with the aerial uncrewed vehicle the minimum speed of the aerial uncrewed vehicle; and comparing the minimum speed and the travel velocity.

3. Any of the preceding embodiments, wherein generating the travel trajectory for the aerial uncrewed vehicle further comprises: determining the minimum speed of the aerial uncrewed vehicle; determining, based on the minimum speed of the aerial uncrewed vehicle, a minimum travel distance predicted to be traveled by the aerial uncrewed vehicle during the predetermined time interval at the minimum speed; determining, based on the travel velocity, a linear distance that an object travels during the predetermined time interval at the travel velocity; and generating the travel trajectory of the aerial uncrewed vehicle to maneuver the aerial uncrewed vehicle so that the minimum travel distance matches the linear distance.

4. Any of the preceding embodiments, further comprising: receiving a target position from a vehicle controller; determining, based on the target position and the travel velocity, a time estimate for traveling from a current position to the target position; and splitting the time estimate into a plurality of instances of the predetermined time interval.

5. Any of the preceding embodiments, wherein determining the travel trajectory further comprises: determining a minimum turn radius for the aerial uncrewed vehicle; and determining the travel trajectory based on the minimum turn radius.

6. Any of the proceeding embodiments, further comprising: receiving an electronic map comprising a plurality of terrains between a current position and a target position; determining, for a land-based uncrewed vehicle of the plurality of uncrewed vehicles and based on the plurality of terrains, a path for traveling to the target position; determining that a linear distance associated with the path is greater than the linear distance associated with the travel velocity; and increasing the travel speed for the land-based uncrewed vehicle based on the travel velocity, the linear distance, and the path.

7. Any of the preceding embodiments, further comprising: determining, based on a first maximum speed of a first uncrewed vehicle, that the first uncrewed vehicle of the plurality of uncrewed vehicles has a maximum speed lower than the travel speed; determining a group of uncrewed vehicles of the plurality of uncrewed vehicles that is associated with the first uncrewed vehicle; and updating the travel speed for the group of uncrewed vehicles to match the maximum speed of the first uncrewed vehicle.

8. A tangible, non-transitory, machine-readable medium storing instructions that, when executed by a data processing apparatus, cause the data processing apparatus to perform operations comprising those of any of embodiments 1-7.

9. A system comprising: one or more processors; and memory storing instructions that, when executed by the processors, cause the processors to effectuate operations comprising those of any of embodiments 1-7.

10. A system comprising means for performing any of embodiments 1-7.

11. A system comprising cloud-based circuitry for performing any of embodiments 1-7.

What is claimed is:

1. A system for navigating fleets of vehicles, the system comprising:

one or more processors; and one or more non-transitory, computer-readable storage media storing instructions, which when executed by the one or more processors cause the one or more processors to perform operations comprising:

receiving, from a vehicle controller, a travel velocity for moving a fleet of uncrewed vehicles, wherein the travel velocity comprises a travel speed;

determining a plurality of uncrewed vehicles within the fleet of uncrewed vehicles wherein the plurality of uncrewed vehicles comprises a land-based uncrewed vehicle and an aerial uncrewed vehicle;

determining a plurality of speed ranges for the plurality of uncrewed vehicles within the fleet of uncrewed vehicles, wherein each speed range comprises a corresponding minimum speed and a corresponding maximum speed;

determining that the aerial uncrewed vehicle has a minimum speed that is higher than the travel speed received from the vehicle controller;

based on determining that the aerial uncrewed vehicle has the minimum speed that is higher than the travel speed received form the vehicle controller, generating a travel trajectory for the aerial uncrewed vehicle based on the travel speed received from the vehicle controller and the minimum speed, wherein the travel trajectory causes the aerial uncrewed vehicle to move at least at the minimum speed, and wherein the travel trajectory causes the aerial uncrewed vehicle to travel a distance that matches a projected linear distance of travel at the travel speed received from the vehicle controller when measured during a predetermined time interval; and transmitting the travel trajectory to the aerial uncrewed vehicle.

2. The system of claim 1, wherein the instructions for determining the plurality of speed ranges for the plurality of uncrewed vehicles within the fleet further cause the one or more processors to perform operations comprising:

retrieving, for the plurality of uncrewed vehicles within the fleet, corresponding vehicle data associated with each vehicle; and extracting from the corresponding vehicle data the corresponding maximum speed and the corresponding minimum speed.

3. The system of claim 1, wherein the instructions for generating the travel trajectory for the aerial uncrewed vehicle further cause the one or more processors to perform operations comprising:

determining the minimum speed of the aerial uncrewed vehicle;

determining, based on the minimum speed of the aerial uncrewed vehicle, a minimum travel distance predicted to be traveled by the aerial uncrewed vehicle during the predetermined time interval at the minimum speed;

determining, based on the travel velocity, a linear distance that an object travels during the predetermined time interval at the travel velocity; and generating the travel trajectory of the aerial uncrewed vehicle to maneuver the aerial uncrewed vehicle so that the minimum travel distance matches the linear distance.

4. The system of claim 1, wherein the instructions further cause the one or more processors to perform operations comprising:

receiving a target position from the vehicle controller;

determining, based on the target position and the travel velocity, a time estimate for traveling from a current position to the target position; and splitting the time estimate into a plurality of instances of the predetermined time interval.

5. The system of claim 1, wherein the instructions for determining the travel trajectory further cause the one or more processors to perform operations comprising:

determining a minimum turn radius for the aerial uncrewed vehicle; and determining the travel trajectory based on the minimum turn radius.

6. The system of claim 1, wherein the instructions further cause the one or more processors to perform operations comprising:

receiving an electronic map comprising a plurality of terrains between a current position and a target position;

determining, for the land-based uncrewed vehicle based on the plurality of terrains, a path for traveling to the target position;

determining that a linear distance associated with the path is greater than the linear distance associated with the travel velocity; and increasing the travel speed for the land-based uncrewed vehicle based on the travel velocity, the linear distance, and the path.

7. The system of claim 1, wherein the instructions further cause the one or more processors to perform operations comprising:

determining, based on the plurality of speed ranges, that a first uncrewed vehicle of the plurality of uncrewed vehicles has a maximum speed lower than the travel speed received from the vehicle controller;

determining a group of uncrewed vehicles from within the fleet that is associated with the first uncrewed vehicle; and updating the travel speed for the group of uncrewed vehicles to match the maximum speed of the first uncrewed vehicle.

8. A method comprising:

receiving, from a vehicle controller, a travel velocity for moving a plurality of uncrewed vehicles, wherein the plurality of uncrewed vehicles comprises an aerial uncrewed vehicle, and wherein the travel velocity comprises a travel speed;

determining that the aerial uncrewed vehicle has a minimum speed that is higher than the travel speed received from the vehicle controller;

based on determining that the aerial uncrewed vehicle has the minimum speed that is higher than the travel speed received from the vehicle controller, generating a travel trajectory for the aerial uncrewed vehicle based on the travel speed received from the vehicle controller and the minimum speed, wherein the travel trajectory causes the aerial uncrewed vehicle to move at least at the minimum speed, and wherein the travel trajectory causes the aerial uncrewed vehicle to travel a distance that matches a projected linear distance of travel at the travel speed received from the vehicle controller when measured during a predetermined time interval; and causing the aerial uncrewed vehicle to travel according to the travel trajectory.

9. The method of claim 8, wherein determining that the aerial uncrewed vehicle has the minimum speed that is higher than the travel speed received from the vehicle controller further comprises:

retrieving, for the plurality of uncrewed vehicles, corresponding vehicle data associated with each vehicle;

extracting from vehicle data associated with the aerial uncrewed vehicle the minimum speed of the aerial uncrewed vehicle; and comparing the minimum speed and the travel speed received from the vehicle controller.

10. The method of claim 8, wherein generating the travel trajectory for the aerial uncrewed vehicle further comprises:

determining the minimum speed of the aerial uncrewed vehicle;

determining, based on the minimum speed of the aerial uncrewed vehicle, a minimum travel distance predicted to be traveled by the aerial uncrewed vehicle during the predetermined time interval at the minimum speed;

determining, based on the travel velocity, a linear distance that an object travels during the predetermined time interval at the travel velocity; and generating the travel trajectory of the aerial uncrewed vehicle to maneuver the aerial uncrewed vehicle so that the minimum travel distance matches the linear distance.

11. The method of claim 8, further comprising:

receiving a target position from the vehicle controller;

determining, based on the target position and the travel velocity, a time estimate for traveling from a current position to the target position; and splitting the time estimate into a plurality of instances of the predetermined time interval.

12. The method of claim 8, wherein determining the travel trajectory further comprises:

determining a minimum turn radius for the aerial uncrewed vehicle; and determining the travel trajectory based on the minimum turn radius.

13. The method of claim 8, further comprising:

receiving an electronic map comprising a plurality of terrains between a current position and a target position;

determining, for a land-based uncrewed vehicle of the plurality of uncrewed vehicles and based on the plurality of terrains, a path for traveling to the target position;

determining that a linear distance associated with the path is greater than the linear distance associated with the travel velocity; and increasing the travel speed for the land-based uncrewed vehicle based on the travel velocity, the linear distance, and the path.

14. The method of claim 8, further comprising:

determining, based on a first maximum speed of a first uncrewed vehicle, that the first uncrewed vehicle of the plurality of uncrewed vehicles has a maximum speed lower than the travel speed received from the vehicle controller;

determining a group of uncrewed vehicles of the plurality of uncrewed vehicles that is associated with the first uncrewed vehicle; and updating the travel speed received from the vehicle controller for the group of uncrewed vehicles to match the maximum speed of the first uncrewed vehicle.

15. One or more non-transitory computer-readable media storing instructions thereon, wherein the instructions cause one or more processors to perform operations comprising:

receiving, from a vehicle controller, a travel velocity for moving a plurality of uncrewed vehicles, wherein the plurality of uncrewed vehicles comprises an aerial uncrewed vehicle, and wherein the travel velocity comprises a travel speed;

determining that the aerial uncrewed vehicle has a minimum speed that is higher than the travel speed received from the vehicle controller;

based on determining that the aerial uncrewed vehicle has the minimum speed that is higher than the travel speed received from the vehicle controller, generating a travel trajectory for the aerial uncrewed vehicle based on the travel speed received from the vehicle controller and the minimum speed, wherein the travel trajectory causes the aerial uncrewed vehicle to move at least at the minimum speed, and wherein the travel trajectory causes the aerial uncrewed vehicle to travel a distance that matches a projected linear distance of travel at the travel speed received from the vehicle controller when measured during a predetermined time interval; and causing the aerial uncrewed vehicle to travel according to the travel trajectory.

16. The one or more non-transitory computer-readable media of claim 15, wherein the instructions for determining that the aerial uncrewed vehicle has the minimum speed that is higher than the travel speed received from the vehicle controller further cause the one or more processors to perform operations comprising:

retrieving, for the plurality of uncrewed vehicles, corresponding vehicle data associated with each vehicle;

extracting from vehicle data associated with the aerial uncrewed vehicle the minimum speed of the aerial uncrewed vehicle; and comparing the minimum speed and the travel speed received from the vehicle controller.

17. The one or more non-transitory computer-readable media of claim 15, wherein the instructions for generating the travel trajectory for the aerial uncrewed vehicle further cause the one or more processors to perform operations comprising:

determining the minimum speed of the aerial uncrewed vehicle;

determining, based on the minimum speed of the aerial uncrewed vehicle, a minimum travel distance predicted to be traveled by the aerial uncrewed vehicle during the predetermined time interval at the minimum speed;

determining, based on the travel velocity, a linear distance that an object travels during the predetermined time interval at the travel velocity; and generating the travel trajectory of the aerial uncrewed vehicle to maneuver the aerial uncrewed vehicle so that the minimum travel distance matches the linear distance.

18. The one or more non-transitory computer-readable media of claim 15, wherein the instructions further cause the one or more processors to perform operations comprising:

receiving a target position from the vehicle controller;

determining, based on the target position and the travel velocity, a time estimate for traveling from a current position to the target position; and splitting the time estimate into a plurality of instances of the predetermined time interval.

19. The one or more non-transitory computer-readable media of claim 15, wherein the instructions for determining the travel trajectory further cause the one or more processors to perform operations comprising:

determining a minimum turn radius for the aerial uncrewed vehicle; and determining the travel trajectory based on the minimum turn radius.

20. The one or more non-transitory computer-readable media of claim 15, wherein the instructions further cause the one or more processors to perform operations comprising:

receiving an electronic map comprising a plurality of terrains between a current position and a target position;

determining, for a land-based uncrewed vehicle based on the plurality of terrains, a path for traveling to the target position;

determining that a linear distance associated with the path is greater than the linear distance associated with the travel velocity; and increasing the travel speed for the land-based uncrewed vehicle based on the travel velocity, the linear distance, and the path.

* * * * *